(12) United States Patent
Diehl et al.

(10) Patent No.: US 12,211,187 B2
(45) Date of Patent: *Jan. 28, 2025

(54) SYSTEM AND METHOD FOR INCREASING SHARPNESS OF IMAGE

(71) Applicant: Pony AI Inc., Grand Cayman (KY)

(72) Inventors: Peter G. Diehl, Shanghai (CN); Robert Dingli, Cupertino, CA (US); Cyrus Abari, San Bruno, CA (US); Yui-Hong Matthias Tan, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 282 days.

This patent is subject to a terminal disclaimer.

(21) Appl. No.: 17/827,412

(22) Filed: May 27, 2022

(65) Prior Publication Data
US 2022/0284550 A1 Sep. 8, 2022

Related U.S. Application Data

(63) Continuation of application No. 16/591,485, filed on Oct. 2, 2019, now Pat. No. 11,348,206.

(51) Int. Cl.
G06T 5/73 (2024.01)
B60K 31/00 (2006.01)
B60W 40/112 (2012.01)
G06T 5/20 (2006.01)
G06T 7/11 (2017.01)

(52) U.S. Cl.
CPC ............ *G06T 5/73* (2024.01); *B60K 31/0008* (2013.01); *B60W 40/112* (2013.01); *G06T 5/20* (2013.01); *G06T 7/11* (2017.01); *B60Y 2400/301* (2013.01); *B60Y 2400/302* (2013.01); *B60Y 2400/306* (2013.01); *G06T 2207/30261* (2013.01)

(58) Field of Classification Search
USPC .................................................. 382/103, 104
See application file for complete search history.

(56) References Cited

U.S. PATENT DOCUMENTS

| 7,725,258 | B2 | 5/2010 | Smitherman |
| 9,179,057 | B2 | 11/2015 | Sako et al. |
| 9,649,980 | B2 | 5/2017 | Watanabe et al. |
| 10,356,330 | B1 * | 7/2019 | Morton .................. H04N 23/54 |
| 10,547,828 | B2 | 1/2020 | Jannard |
| 10,823,935 | B2 * | 11/2020 | Kamiya .................. H04N 23/54 |
| 11,348,206 | B2 * | 5/2022 | Diehl ................. B60K 31/0008 |

(Continued)

*Primary Examiner* — Ishrat I Sherali
(74) *Attorney, Agent, or Firm* — Sheppard, Mullin, Richter & Hampton LLP; Xin Xie

(57) ABSTRACT

Provided herein is a system and method that acquires data and determines a driving action based on the data. The system comprises a sensor, one or more processors, and a memory storing instructions that, when executed by the one or more processors, causes the system to perform, determining data of interest comprising an object, feature, or region of interest, determining whether a sharpness of the data of interest exceeds a threshold, in response to determining that the sharpness does not exceed a threshold, operating the sensor to increase the sharpness of the data of interest until the sharpness exceeds the threshold, in response to the sharpness exceeding the threshold, determining a driving action of a vehicle based on the data of interest, and performing the driving action.

17 Claims, 8 Drawing Sheets

(56) References Cited

U.S. PATENT DOCUMENTS

| | | | |
|---|---|---|---|
| 2012/0176528 A1 | 7/2012 | Denny | |
| 2014/0324266 A1* | 10/2014 | Zhu | G01S 13/865 |
| | | | 382/104 |
| 2017/0374269 A1* | 12/2017 | Govindarao | H04N 23/959 |
| 2019/0004284 A1* | 1/2019 | Kamiya | H04N 23/54 |
| 2019/0306966 A1* | 10/2019 | Byrne | G02B 7/028 |
| 2023/0245414 A1* | 8/2023 | Lewin | G06V 10/25 |
| | | | 382/100 |

\* cited by examiner

SYSTEM AND METHOD FOR INCREASING SHARPNESS OF IMAGE

CROSS REFERENCE TO RELATED APPLICATIONS

This application is a continuation of U.S. application Ser. No. 16/591,485, filed on Oct. 2, 2019, the content of which is incorporated by reference in its entirety into the present disclosure.

TECHNICAL FIELD

The present disclosure relates generally to sensors that can increase a sharpness of certain objects or features, and expand a field of view and depth of field. In particular, the present disclosure relates to cameras that can increase the sharpness of objects or features away from a plane of focus and capture objects or features previously outside its field of view.

BACKGROUND

Vehicles such as autonomous vehicles (AVs) may have sensors such as camera, LiDAR, and radar sensors to capture sensor data such as images and maps. Currently a camera on a vehicle has a limited field of view and depth of field. For example, a camera's depth of field may be limited to positions at or near the plane of focus of the camera, perpendicular to a lens of the camera. In order to capture an adequate field of view and depth of field, numerous cameras are required. The presence of numerous cameras increases cost and creates issues of space restraints to assemble the cameras on a car and time syncing data from different cameras. These shortfalls are addressed by the present disclosures, which provides an efficient system and method for limiting a required number of sensors while increasing a field of view and depth of field.

SUMMARY

Described herein are systems and methods for increasing a field of view of a sensor and depth of field. For example, the systems and methods may increase a sharpness of individual objects or features within the field of view by performing one or more operations on a sensor. For example, the systems and methods discussed herein may capture traffic signs or landmarks, and moving traffic, with enhanced sharpness. Capturing data with enhanced sharpness may assist a vehicle system in determining driving actions of the vehicle. For example, clearly detecting a stop sign may be important for a vehicle to properly stop. In addition, knowing locations, speeds, and accelerations of other vehicles may be important for a vehicle in determining whether and/or when to make a lane change or turn.

Various embodiments of the present disclosure provide a system comprising a sensor, one or more processors, and a memory storing instructions that, when executed by the one or more processors, causes the system to perform: determining data of interest, wherein the data of interest comprises an object, feature, or region of interest; determining whether a sharpness of the data of interest exceeds a threshold; in response to determining that the sharpness does not exceed a threshold, operating the sensor to increase the sharpness of the data of interest until the sharpness exceeds the threshold; in response to the sharpness exceeding the threshold, determining a driving action of a vehicle based on the data of interest; and performing the driving action.

In some embodiments, the operating the sensor comprises performing one or more operations selected from a group consisting of: an azimuth rotation, a tilt, and a translation.

In some embodiments, the operating the sensor comprises determining which one of an azimuth rotation, a tilt, and a translation to perform based on a difference between the sharpness of the data and the threshold.

In some embodiments, the determining data of interest comprises determining one or more objects or features to be data of interest based on a rate of change of the one or more objects or features.

In some embodiments, the data of interest comprises a traffic light, a road sign, a pedestrian, or another vehicle.

In some embodiments, the determining data of interest comprises determining a region to be data of interest in response to a temperature, barometric pressure, pollution, or smog level of the region differing from a temperature, barometric pressure, pollution, or smog level of a surrounding region exceeding a second threshold.

In some embodiments, the determining data of interest comprises predicting an existence of an object or feature based on another object or feature being present at a same location.

In some embodiments, the determining data of interest comprises predicting an existence of an object or feature based on a road condition or terrain.

In some embodiments, the threshold is determined based on a weather condition, an air condition, or a time of day.

In some embodiments, the instructions further cause the system to perform: in response to the sharpness of the data of interest exceeding the threshold, sending the data of interest to another vehicle.

Various embodiments of the present disclosure provide a method implemented by a computing system including one or more processors and storage media storing machine-readable instructions, wherein the method is performed using the one or more processors. The method comprises determining data of interest, wherein the data of interest comprises an object, feature, or region of interest; determining whether a sharpness of the data of interest exceeds a threshold; in response to determining that the sharpness does not exceed a threshold, operating the sensor to increase the sharpness of the data of interest until the sharpness exceeds the threshold; and in response to the sharpness exceeding the threshold, determining a driving action of a vehicle based on the data of interest; and performing the driving action.

In some embodiments, the operating the sensor comprises performing one or more operations selected from a group consisting of: an azimuth rotation, a tilt, and a translation.

In some embodiments, the operating the sensor comprises determining which one of an azimuth rotation, a tilt, and a translation to perform based on a difference between the sharpness of the data and the threshold.

In some embodiments, the determining data of interest comprises determining one or more objects or features to be data of interest based on a rate of change of the one or more objects or features.

In some embodiments, the data of interest comprises a traffic light, a road sign, a pedestrian, or another vehicle.

In some embodiments, the determining data of interest comprises determining a region to be data of interest in response to a temperature, barometric pressure, pollution, or smog level of the region differing from a temperature, barometric pressure, pollution, or smog level of a surrounding region exceeding a second threshold.

In some embodiments, the determining data of interest comprises predicting an existence of an object or feature based on another object or feature being present at a same location.

In some embodiments, the determining data of interest comprises predicting an existence of an object or feature based on a road condition or terrain.

In some embodiments, the method further comprises determining the threshold based on a weather condition, an air condition, or a time of day.

In some embodiments, the method further comprises, in response to the sharpness of the data of interest exceeding the threshold, sending the data of interest to another vehicle.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In order for a sensor such as a camera to effectively capture data having an adequate field of view and selectively enhancing certain features or objects, an actuator of the camera may adjust a position of a lens of the camera with four degrees of freedom: translate along an elevation direction perpendicular to a plane of focus, translate along a direction parallel to the plane of focus, rotate in an azimuth direction about an axis perpendicular to a plane of the lens, and tilt the plane of the lens such that the plane of the lens is not parallel to an image plane. Based on the enhanced features or objects, a vehicle system may determine a driving action and perform the driving action.

Figure 1:
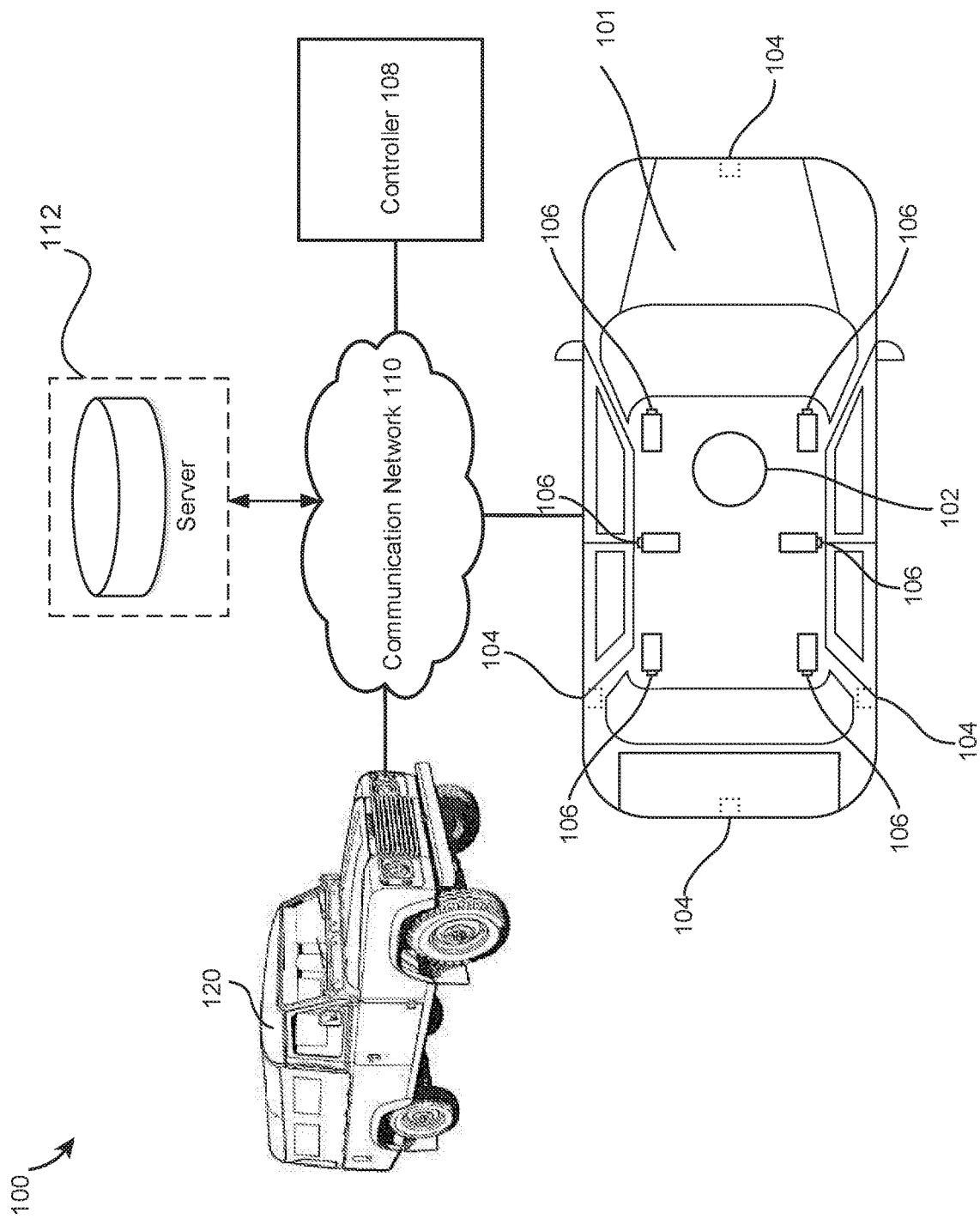
FIG. 1 illustrates an example environment of a system that acquires data using a sensor, increases a field of view and enhances sharpness of objects acquired in the data, determines a driving action of a vehicle based on the data, and performs the driving action, according to an embodiment of the present disclosure.

FIG. 1 illustrates an example environment of a system that acquires data using a sensor, increases a field of view and enhances sharpness of objects acquired in the data, determines a driving action of a vehicle based on the data, and performs the driving action, according to an embodiment of the present disclosure. In FIG. 1, a vehicle such as an autonomous vehicle 101 may include myriad sensors (LiDAR systems 102, radar systems 104, cameras 106, GPS, sonar, ultrasonic, IMU (inertial measurement unit), accelerometers, gyroscopes, magnetometers, and FIR (far infrared) sensors) to detect and identify objects in the surrounding. For example, the LiDAR systems 102 can generate a three-dimensional map of the environment. The LiDAR systems 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

The cameras 106 may capture data with an enhanced field of view and depth of field, and capture objects or features with increased sharpness, as will be described with respect to FIGS. 2A-2D. The data (e.g., objects or features) of increased sharpness from the cameras 106 may be used in driving and/or navigation actions of the vehicle 101 by a controller 108 of the vehicle 101. The controller 108 may coordinate driving actions such as changing lanes, stopping, turning, and/or controlling a speed and/or acceleration of the vehicle 101. In some examples, after the cameras 106 acquire data of not only a nearest traffic light but also traffic lights over a distance (e.g., when the traffic lights turn green), the controller 108 may control a speed and/or other driving action of the vehicle 101 to reduce or eliminate a time for waiting at traffic lights. For example, the controller 108 may take the data regarding what time each traffic light turned green and an expected time span in which each traffic light may remain green to estimate when each traffic light may turn yellow or red, to determine a required speed for the vehicle 101 to pass each traffic light (not only the nearest traffic light, but also planning ahead for farther traffic lights) when each traffic light is green. In some examples, after the cameras 106 acquire data of traffic, the controller 108 may control a speed and/or other driving action of the vehicle 101 to reduce or minimize a time for waiting in traffic. The controller 108 may further communicate planned driving actions of the vehicle 101 to other vehicles such as the another vehicle 120 so the other vehicles such as the another vehicle 120 may control their speed and/or other driving actions to reduce, minimize, or eliminate waiting in traffic and/or at traffic lights. For example, if the vehicle 101 plans to change to a left lane, the planned action may be communicated to other vehicles such as the another vehicle 120. The another vehicle 120 may plan to change to a right lane to avoid interference with the vehicle 101. Other vehicles may plan accordingly to ensure an even distribution of vehicles on each lane. The data from the LiDAR systems 102, radar systems 104 and cameras 106 may be sent over a communication network 110 to a server 112 that may store the data for use by other vehicles such as another vehicle 120. The vehicle 101 may also acquire data from the another vehicle 120, either directly in an ad-hoc network, or through the server 112.

Figure 2A:
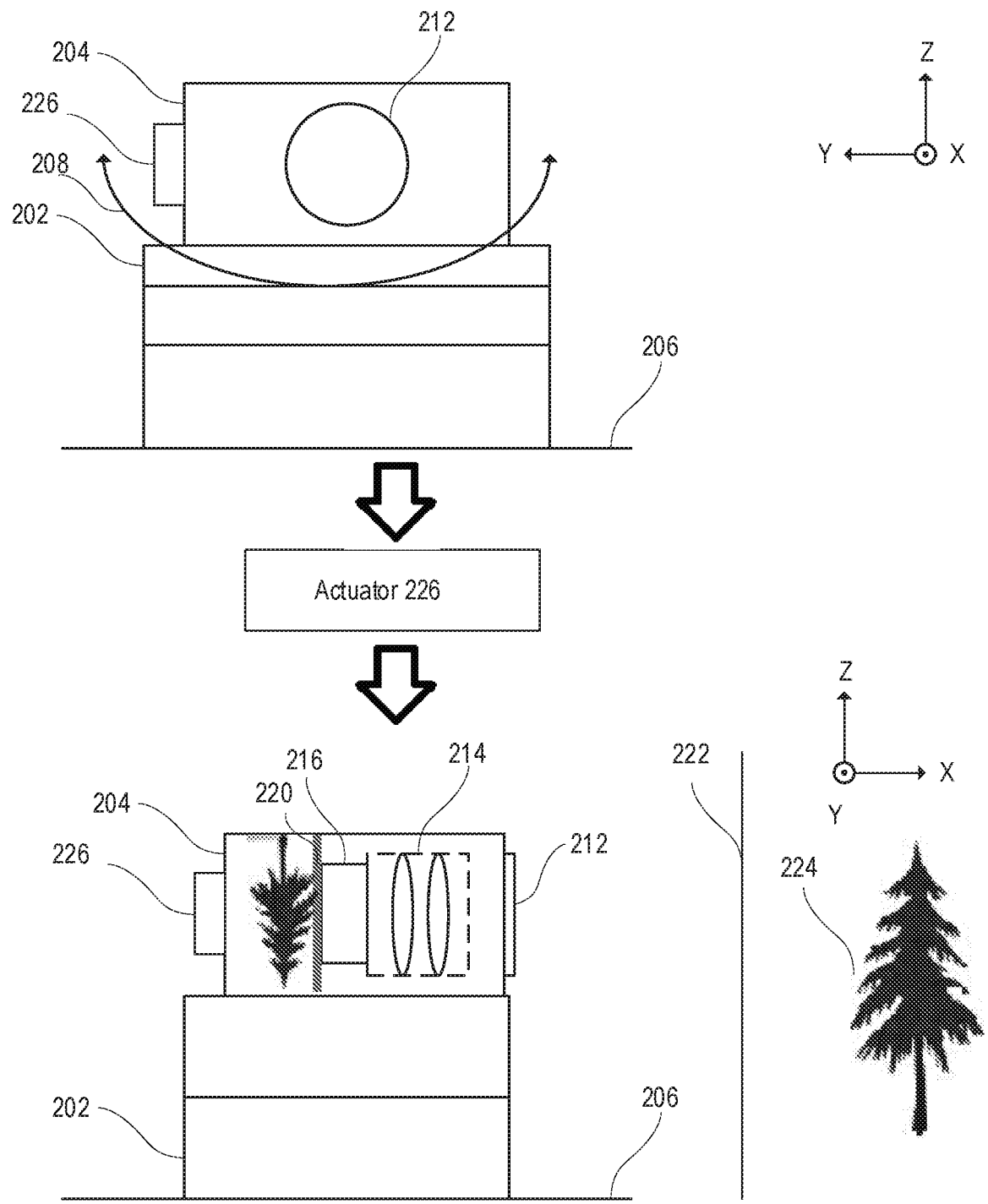
FIGS. 2A-2D illustrate exemplary camera systems and implementations thereof, according to an embodiment of the present disclosure.

FIGS. 2A-2D illustrate exemplary camera systems and implementations thereof, according to an embodiment of the present disclosure. In FIG. 2A, the camera system may include a platform 202 (optional) and a camera module 204 disposed on the platform 202. The platform 202 may be mounted on, coupled to, or affixed to a component 206 of a vehicle such as a roof. The camera module 204 may comprise an image sensor 216, a lens system 214, an aperture 212, an image plane 220, and one or more actuators 226.

In some embodiments, the aperture 212 may include a shutter through which light entering the camera module 204 can be controlled. The shutter is a device that can vary a size of an opening based on levels of light. For example, under bright light, the shutter may decrease its size of opening to limit light entering the camera module 204. In contrast, under low light, the shutter may increase its size of opening to increase light entering the camera module 204.

In some embodiments, the lens system 214 may utilize passive phase detection techniques to adjust a focus on an object as the object appears in a field of view of the camera module 204. In some embodiments, the lens system 214 measures a phase difference between the object and the camera module 208. This phase difference can be used by the lens system 214 to adjust the focus of the camera module 204 such that the object is in focus. For example, the lens system 214 may determine the focus of the camera module 204 to be either front or back focused (e.g., whether the focus of the camera module 204 is either in front of or behind a plane of the image sensor 216). Based on this information (e.g., phase differences), the optical system 216 may adjusts the focus of the camera module 204 such that the focus is on the plane of the image sensor 216, as shown by the image plane 220.

The lens system 214 may comprise one or more lenses that collect, collimate, and converge incoming light onto the plane of the image sensor 216. In some embodiments, the lens system 214 may comprise the one or more actuators 226 that are coupled to the lens system 214. The one or more actuators 226 can be configured to move the lens system 214 to adjust the focus of the camera module 204. The one or more actuators 226 may include ultrasonic or piezoelectric motors, for example. In general, the lens system 214 works as a closed-loop control to maintain the focus of the camera module 204 on the object. For example, an object in view of the camera module 204 may move in and out of focus due to motions of either the object or a vehicle on which the camera module 204 is disposed. In this example, the lens system 214 may measure real time phase differences between the object and the camera module 204 and continuously adjust the focus of the camera module 204 such that the object remains in focus to the camera module 204, independent of the motions. In some embodiments, the lens system 214 may have limited focal lengths (e.g., focus of the camera module 204). For example, the lens system 214 may have a focal length of anywhere from 10 millimeters (e.g., wide angle) to 700 millimeters (e.g., telephoto). For instance, the lens system 214 can be a telephoto lens system with focal lengths from 200 millimeters to 400 millimeters. In this instance, the telephoto lens system can maintain focus on an object within the focal lengths of 200 millimeters to 400 millimeters.

In some embodiments, the image sensor 216 can be utilized to capture image data. In one embodiment, the image sensor 216 may be a complementary metal oxide semiconductor (CMOS) type. In another embodiment, the image sensor 216 may be a charge-coupled device (CCD) type. In some cases, the image sensor 216 may include additional electronic circuitry to convert analog or light signals captured by the image sensor 216 to digital signals representing an image.

The actuator 226 may perform an azimuth rotation 208 on the lens system 214 (rotate the lens system 214 in a x-y plane, with respect to the z-axes. As a result of the azimuth rotation 208, the lens system 214 may increase its field of view to capture objects or features that were previously uncaptured. For example, after the azimuth rotation 208, the lens system 214 may be able to capture an object 224 within its field of view, that was previously not within its field of view. The lens system 214, after the azimuth rotation 208, may have a plane of focus 222. Objects at or near the plane of focus 222 may be sharp. The actuator 226 may be configured to perform 360-degree rotation, or 180-degree rotation, in some embodiments. In some embodiments, the actuator 226 may comprise one or more motors capable of generating motion, such as direct current motors, brushless direct current motors, switch reluctance motors, inductor motors, alternate current motors, synchronous motors, servo motors, or stepper motors. In some embodiments, the motors may be coupled to one or more gears.

Figure 2B:
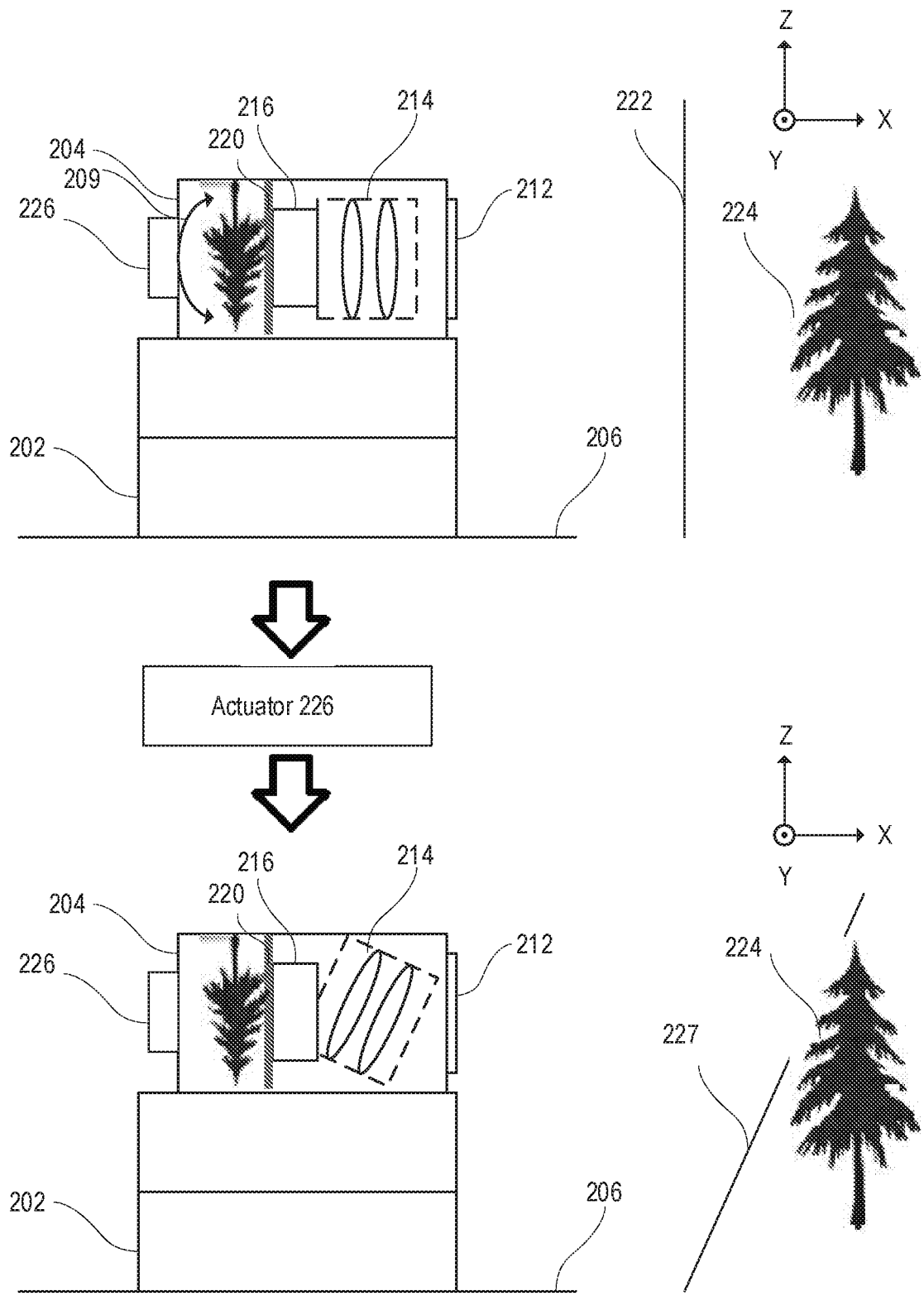

FIG. 2B illustrates the camera system of FIG. 2A. Additionally, in FIG. 2B, the actuator 226 may be configured to perform a tilt function 209 on the lens system 214, in which the lens system is tilted with respect to the image plane 220 in a x-z plane, with respect to a y-axis. As a result of the tilt function 209, a plane of the lens system 214 is no longer parallel to the image plane 220, unlike in FIG. 2A. A plane of focus of the lens system 214 may be changed to a second plane of focus 227. The object 224 may be closer to the second plane of focus 227, resulting in a sharper, clearer image. As a result of the tilt function 209, the lens system 214 may capture objects or features of a sharper quality.

In some embodiments, the actuator 226 may perform the tilt function 209 simultaneously with the azimuth rotation 208 of FIG. 2A. In some embodiments, the actuator 226 may only perform the tilt function 209 simultaneously with the azimuth rotation 208 if an amount of tilt or an amount of azimuth rotation does not exceed a threshold amount. For example, the actuator 226 may only perform the tilt function 209 simultaneously with the azimuth rotation 208 if the azimuth rotation does not exceed 45 degrees, 30 degrees, or 90 degrees. As another example, the actuator 226 may only perform the tilt function 209 simultaneously with the azimuth rotation 208 if the tilt function 209 does not exceed five degrees, eight degrees, or ten degrees. In some embodiments, a maximum amount of azimuth rotation to be performed simultaneously with the tilt function may be based on an amount of simultaneous tilt performed. In some embodiments, a maximum amount of tilt to be performed simultaneously with the azimuth rotation may be based on an amount of simultaneous azimuth rotation performed.

In some embodiments, the actuator 226 may perform the tilt function 209 before or after the azimuth rotation 208. In some embodiments, a maximum amount of azimuth rotation may be based on an amount of tilt performed. In some embodiments, a maximum amount of tilt may be based on an amount of azimuth rotation performed.

Figure 2C:
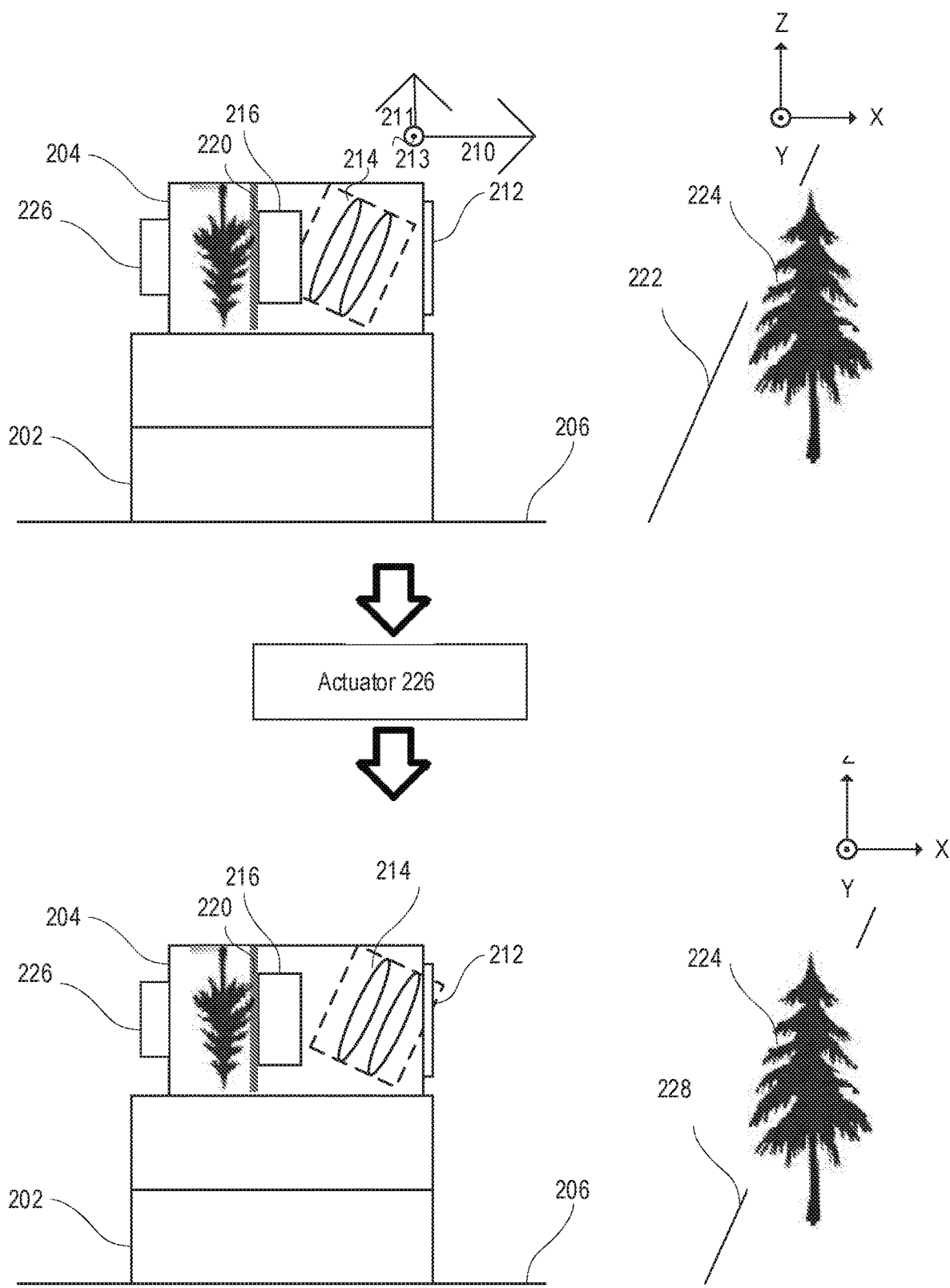

FIG. 2C illustrates the camera system of FIG. 2B. Additionally, in FIG. 2C, the actuator 226 may be configured to perform a translation 210 along an x-axis, a translation 211 along a z-axis, and/or a translation 213 along a y-axis, on the lens system 214, in which the lens system is translated with respect to the image plane. In FIG. 2C, the actuator 226 is shown to perform the translation 210 along the x-axis. As a result of the translation 210, a plane of focus of the lens system 214 may be changed to a third plane of focus 228. The object 224 may be closer to the second plane of focus 228, resulting in an even sharper, clearer image. Additionally, the translation 210 may increase a depth of field to capture other objects or features with clarity and sharpness.

In some embodiments, the actuator 226 may perform the one or more translations 210, 211, and/or 213 simultaneously with the tilt function 209 and/or the azimuth rotation 208 of FIG. 2A and FIG. 2B. In some embodiments, the actuator 226 may only perform the one or more translations 210, 211, and/or 213 simultaneously with the azimuth rotation 208 or the tilt function 209 if an amount of tilt and/or an amount of azimuth rotation does not exceed a threshold amount. For example, the actuator 226 may only perform the one or more translations 210, 211, and/or 213 simultaneously with the azimuth rotation 208 if the azimuth rotation does not exceed 45 degrees, 30 degrees, or 90 degrees. As another example, the actuator 226 may only perform the one or more translations 210, 211, and/or 213 simultaneously with the tilt function 209 if the tilt function 209 does not exceed five degrees, eight degrees, or ten degrees. In some embodiments, a maximum amount of the one or more translations 210, 211, and/or 213 to be performed simultaneously with the tilt function 209 may be based on an amount of simultaneous tilt performed. In some embodiments, a maximum amount of the one or more translations 210, 211, and/or 213 to be performed simultaneously with the azimuth rotation may be based on an amount of simultaneous azimuth rotation performed.

In some embodiments, the actuator 226 may perform the one or more translations 210, 211, and/or 213 before or after the azimuth rotation 208 or before or after the tilt function 209. In some embodiments, a maximum amount of translation may be based on an amount of tilt performed. In some embodiments, a maximum amount of translation may be based on an amount of azimuth rotation performed.

Figure 2D:
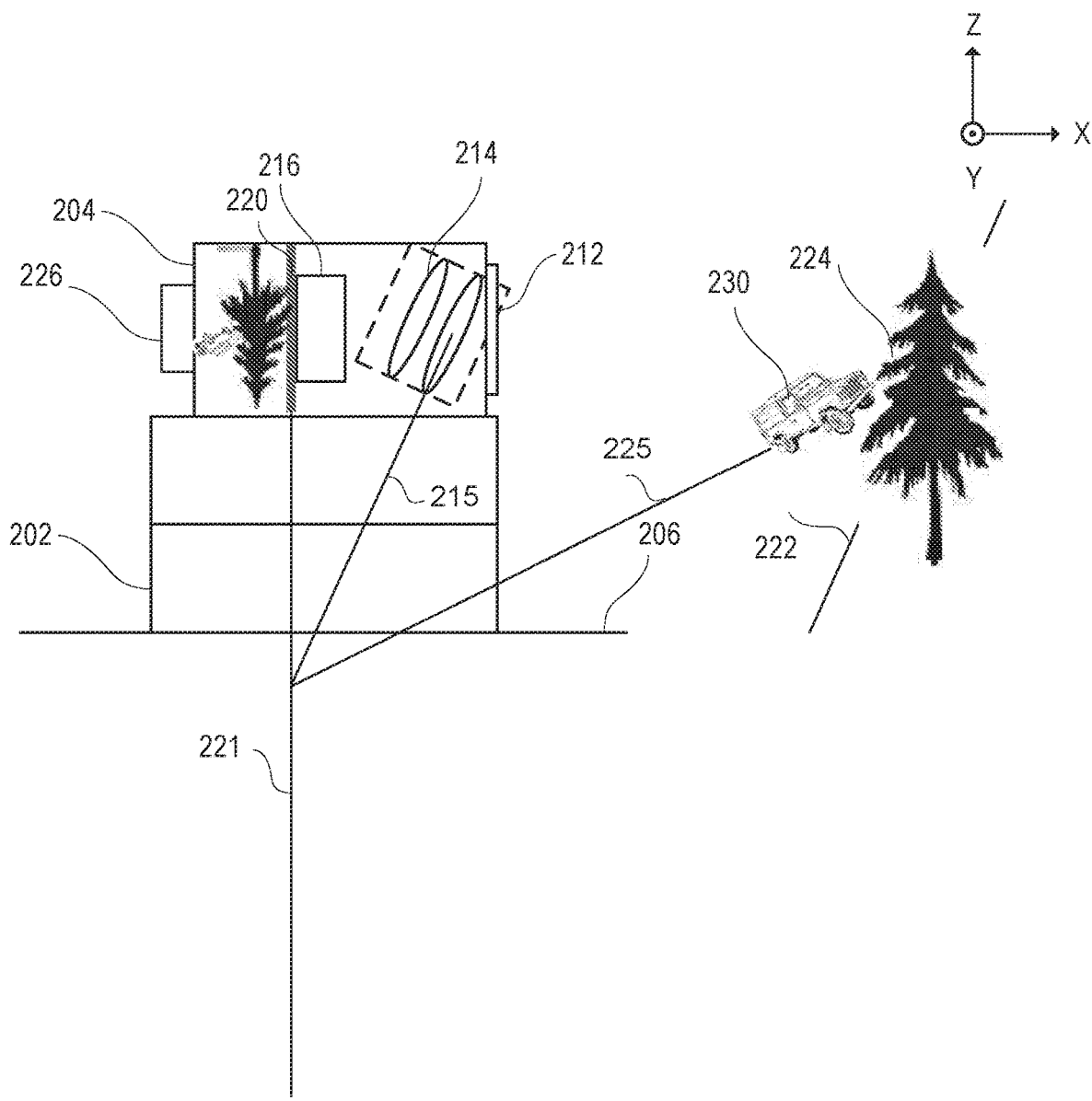

FIG. 2D illustrates the camera system of FIG. 2C. Additionally, in FIG. 2D, a plane of sharpest focus 225 may be determined by an intersection of an extension 221 from the image plane 220, a plane 215 extending from, or of, the lens system 214, and a plane extending from the object 224 to the intersection of the extension 221 and the plane 215 of the lens system 214.

Figure 3:
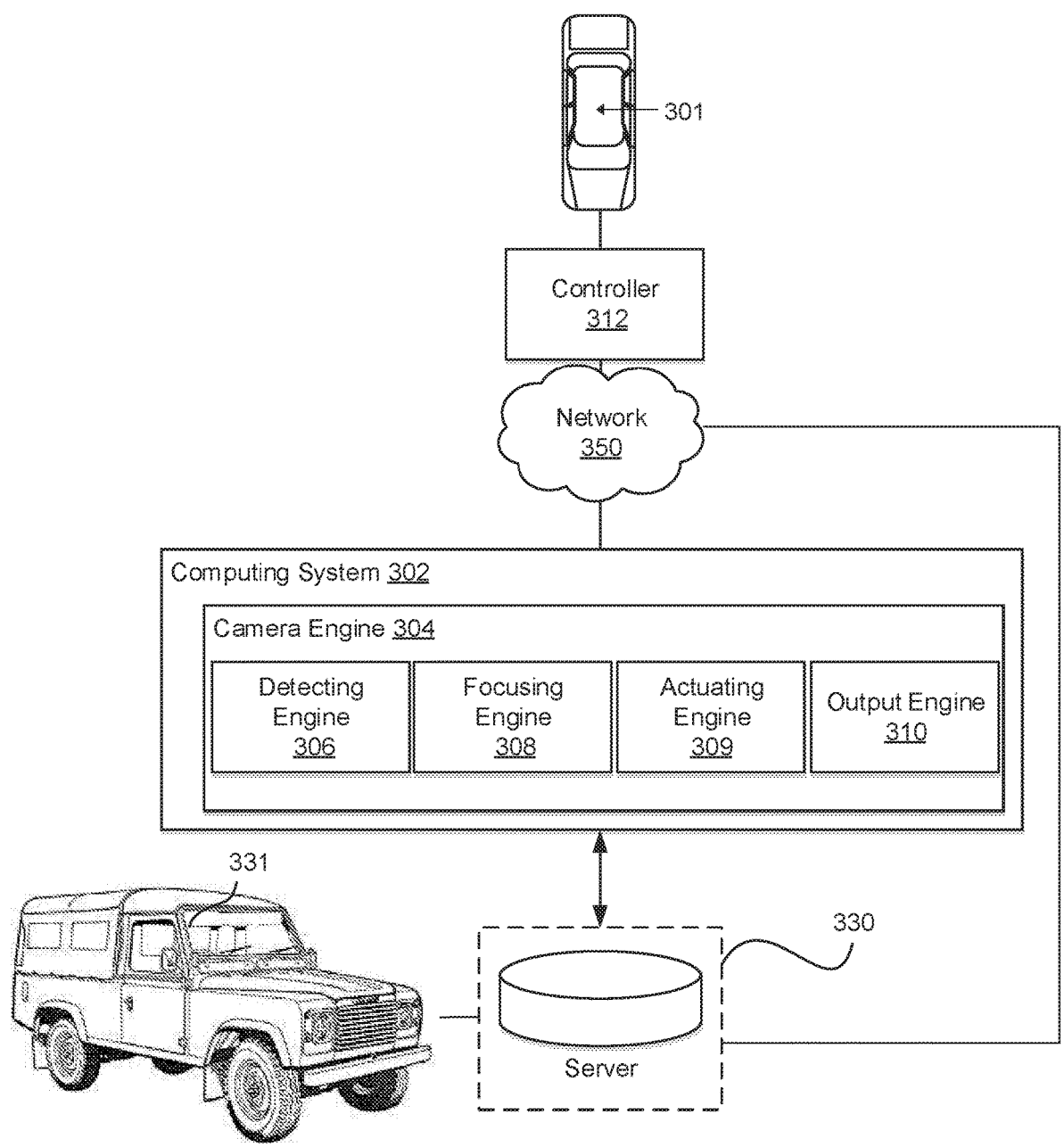
FIG. 3 illustrates an exemplary system for implementing a camera system onboard a vehicle, according to an embodiment of the present disclosure.

FIG. 3 illustrates an exemplary system 300 for implementing a camera system onboard a vehicle, according to an embodiment of the present disclosure.

The exemplary system 300 may include a vehicle 301 which, for example, may be implemented as vehicle 101, and connected to at least one computing system 302 that includes one or more processors and memory. The processors may be configured to perform various operations by interpreting machine-readable instructions. In some embodiments, the example environment 300 may be implemented as a data platform. In some embodiments, the example environment 300 may be configured to interact with computing systems of the data platform. In various embodiments, one or more computing systems of the data platform may receive and process search queries to obtain sensor data, process the sensor data, determine stop points and available stop points, select a stop point, reserve a stop point, and/or update a status of stop points.

In some embodiments, the computing system 302 may include a camera engine 304 that may control operations of the camera system as described in FIGS. 2A-2D. The camera engine 304 may include a detecting engine 306, a focusing engine 308, an actuating engine 309, and an output engine 310. The camera engine 304 may be executed by the processor(s) of the computing system 302 to perform various operations including those operations described in reference to the detecting engine 306, the focusing engine 308, and the actuating engine 309, and the output engine 310. In general, the camera engine 304 may be implemented, in whole or in part, as software that is capable of running on one or more computing devices or systems. In one example, the camera engine 304 may be implemented as or within a software application running on one or more computing devices (e.g., user or client devices) and/or one or more servers (e.g., network servers or cloud servers, servers 330). In some instances, various aspects of the detecting engine 306, the focusing engine 308, and the actuating engine 309, and the output engine 310 may be implemented in one or more computing systems and/or devices. In some instances, one or more of the detecting engine 306, the focusing engine 308, and the actuating engine 309, and the output engine 310 may be combined or integrated into a single processor, and some or all functions performed by one or more of the detecting engine 306, the focusing engine 308, and the actuating engine 309, and the output engine 310 may not be spatially separated, but instead may be performed by a common processor. The environment 300 may also include the one or more servers 330 accessible to the computing system 302. The one or more servers 330 may store pictorial and map data from the vehicle 301, one or more sensors of other vehicles, one or more satellite maps, and/or one or more road sensors such as sensors on traffic lights. In some embodiments, the one or more servers 330 may integrate data from different sensors. In other embodiments, the one or more servers 330 may keep the data from the different sensors separate. The one or more servers 330 may be accessible to the computing system 302 either directly or over a network 350. In some embodiments, the one or more servers 330 may store data that may be accessed by the camera engine 304 to provide the various features described herein. In some embodiments, the one or more servers 330 may store data that may be accessed by another vehicle 331. As an example, image data generated from the camera system 304 may be stored in the server 330 and accessed by the another vehicle 331. The another vehicle 331 may also acquire data from the vehicle 301, either directly in an ad-hoc network, or through the server 330. In some instances, the one or more servers 330 may include federated data stores, databases, or any other type of data source from which data may be stored and retrieved, for example. In some implementations, the one or more servers 330 may include various types of data sets on which determinations of accuracy or consistency with other information can be made. In general, a user operating a computing device can interact with the computing system 302 over the network 350, for example, through one or more graphical user interfaces and/or application programming interfaces.

The detecting engine 306 may be configured to detect or determine one or more objects, features, and/or regions of interest within a field of view of a camera such as camera module 204. In some embodiments, if the detecting engine 306 detects that objects or features in a field of view change, or if objects or features change or move at a rate faster than a threshold rate, the detecting engine 306 may determine that one or more of the objects or features are objects or features of interest. In some examples, if the detecting engine 306 detects a natural disaster such as a fire or hurricane, and/or a rate of change of the fire or hurricane to be greater than a threshold rate, the detecting engine 306 may determine that the fire or hurricane is a feature of interest. In some examples, the detecting engine 306 may determine that a region is a region of interest based on environmental conditions or a change in the environmental conditions. For example, if the detecting engine 306 detects a temperature, pressure (e.g., barometric pressure), pollution, or smog level in a specific location is higher than a surrounding region, or if a rate of change of a temperature, pressure, pollution, or smog level in a specific location is greater than a threshold or higher than surroundings, which may indicate an emergency or urgent situation that warrants attention, the detecting engine 306 may determine a portion or all of the specific location to be a region of interest. In some embodiments, the detecting engine 306 may detect objects or features of interest based on a type of the objects or features, and/or based on a terrain or road conditions. For example, the detecting engine 306 may recognize and detect traffic signs, landmarks, road objects, other vehicles, and/or pedestrians as features or objects of interest. In response to the detecting engine 306 detecting or determining an object, feature, or region of interest, the focusing engine 308 may determine whether the sharpness or focus of the object, feature, or region of interest is above a threshold.

In some embodiments, the detecting engine 306 may be configured to predict that an object or feature of interest should be present, for example, based on previous data at a same location, based on surroundings, and/or based on an elapsed time since a most recent appearance of an object or feature of interest. In some examples, the detecting engine 306 may predict that a feature such as a stop sign should be present at a specific location based on previous data indicating a presence of a stop sign at the specific location. In some examples, the detecting engine 306 may predict that a feature such as a stop sign or traffic light should be present based on a presence of other features such as an intersection, and/or other vehicles traveling in an orthogonal direction. Thus, the detecting engine 306 may predict or infer that a feature should be present based on an associative relationship between features or objects, and/or at least one of the features or objects being present. The detecting engine 306 may further predict or infer that a feature should be present based on a terrain or road conditions. For example, the detecting engine 306 may predict that a sign to slow down should be present in response to a road being curvy, sloped, or slippery. In some embodiments, the detecting engine 306 may predict that pedestrians may be present based on a presence of a crosswalk or sidewalk. In some embodiments, the detecting engine 306 may predict a presence of an object or feature based on an elapsed time or distance since a most recent appearance of an object or feature of interest exceeding a threshold time. For example, if more than one mile, or one minute, has elapsed since a most recent traffic light appeared, the detecting engine 306 may predict that a traffic light should be coming up shortly. In response to the detecting engine 306 predicting that an object or feature should be present but no such object or feature is seen in a current field of view, the detecting engine 306 may communicate with the actuating engine 309 to perform rotation, tilt, or translation in order to change or increase the current field of view.

The focusing engine 308 may, in response to communicating with the detecting engine 306 regarding features, objects, or regions of interest, determine whether the features, objects, or regions of interest have a sharpness or focus above a threshold. In response to the sharpness or focus being above a threshold, the focusing engine 308 may communicate with the output engine 310 to output the features, objects, or regions of interest. In response to the sharpness or focus being below or at a threshold, the focusing engine 308 may communicate with the actuating engine 309 to increase a sharpness or focus of the features, objects, or regions of interest. In some embodiments, the focusing engine 308 may continuously determine whether a sharpness or focus of the features, objects, or regions of interest exceeds a threshold, for example, after each operation of the actuating engine 309, until the sharpness or focus exceeds a threshold. In some embodiments, the threshold may be determined based on a type of object, road or weather conditions, and/or a time of day. For example, the threshold may be higher for a pedestrian compared to a tree, because an importance of accurately detecting a pedestrian is higher compared to that of accurately detecting a tree. In some examples, if weather conditions are rainy, snowy, hazy, or if air conditions are smoggy or polluted, the threshold may be lower than what the threshold would be in normal weather or air or atmosphere conditions, because it may not be possible to detect objects, features, or regions of interest with as much sharpness. In some examples, at night, the threshold may be lower than what the threshold would be during the day.

The actuating engine 309 may be implemented as actuator 226 as described in FIGS. 2A-2D. The actuating engine 309 may communicate with the focusing engine 308 and the detecting engine 306. In some examples, the actuating engine 309 may perform an operation (for example, an azimuth rotation 208, a tilt function 209, or a translation 210, 211, or 213), in response to the focusing engine 308 determining that a sharpness or focus of a features, objects, or regions of interest does not exceed a threshold. In response to the actuating engine 309 performing the operation, the focusing engine 308 may determine whether the sharpness or focus exceeds a threshold. If the focusing engine 308 determines that the sharpness still does not exceed the threshold, the actuating engine 309 may continue to perform the operation, or perform an operation of a different type, until the focusing engine 308 determines that the sharpness or focus exceeds a threshold. If the focusing engine 308 determines that the sharpness exceeds the threshold, the data of the objects, features, or regions of interest is sent to the output engine 310. If the actuating engine 309 cannot increase the sharpness or focus above a threshold, another sensor of a different modality, such as LiDAR, may be used to acquire the data of the objects, features, or regions of interest.

In some embodiments, the actuating engine 309 may determine a type of operation (e.g., azimuth rotation, tilt function, translation) or, if the actuating engine 309 is already performing an operation, whether to continue to perform an operation of a same type or to perform an operation of a different type based on how much increase in sharpness or focus is needed (e.g., difference between current sharpness or focus and threshold). In some examples, if a larger amount (more than a second threshold) of increase in sharpness or focus is needed, the actuating engine 309 may perform an azimuth rotation and/or a tilt function. In some examples, if a smaller amount of increase in sharpness or focus is needed, the actuating engine 309 may perform a translation. In some embodiments, the actuating engine 309 may determine a whether to continue to perform an operation of a same type or to perform an operation of a different type based on whether the operation currently performed is actually increasing sharpness or focus, and/or how much the operation is actually increasing sharpness or focus (e.g., how effective the operation is).

In some embodiments, the actuating engine 309 may, in response to the detecting engine 306 predicting that an object or feature should be present but no such object or feature being actually seen in a current field of view, perform an operation such as an azimuth rotation, tilt function, or translation in order to change or increase the current field of view. The actuating engine 309 may continue to perform one or more operations until the object or feature is detected, or determined not to be present (e.g., after scanning a 360 degree or 180 degree field of view).

The output engine 310 may communicate with the detecting engine 306, the focusing engine 308, and the actuating engine 309 to output data (features, objects, regions) determined to have sharpness or focus exceeding a threshold to the controller 312, and the one or more servers 330. The controller 312 of the vehicle 301 may be configured to determine or change one or more driving and/or navigation actions based on the data. The controller 312 may coordinate driving actions such as changing lanes, stopping, turning, and/or controlling a speed and/or acceleration of the vehicle 301. In some examples, in response to the controller 312 acquiring data of not only a nearest traffic light but also traffic lights over a distance (e.g., when the traffic lights turn green and an expected time the traffic lights will turn red or yellow), the controller 312 may control a speed and/or other driving action of the vehicle 301 to reduce or eliminate a time for waiting at traffic lights. For example, the controller 312 may take the data regarding what time each traffic light turned green and an expected time span in which each traffic light may remain green to estimate when each traffic light may turn yellow or red, to determine a required speed for the vehicle 301 to pass each traffic light (not only the nearest traffic light, but also planning ahead for farther traffic lights) when each traffic light is green. In some examples, the controller 312 may, based on the data, control a speed and/or other driving action of the vehicle 301 to reduce or minimize a time for waiting in traffic. The controller 312 may further communicate planned driving actions of the vehicle 301 to other vehicles such as the another vehicle 331 so the other vehicles such as the another vehicle 331 may control their speed and/or other driving actions to reduce, minimize, or eliminate waiting in traffic and/or at traffic lights. For example, if the vehicle 301 plans to change to a left lane, the controller 312 may communicate the planned action may be communicated to other vehicles such as the another vehicle 331. The another vehicle 331 may plan to change to a right lane to avoid interference with the vehicle 301. Other vehicles may plan accordingly to ensure an even distribution of vehicles on each lane.

Figure 4:
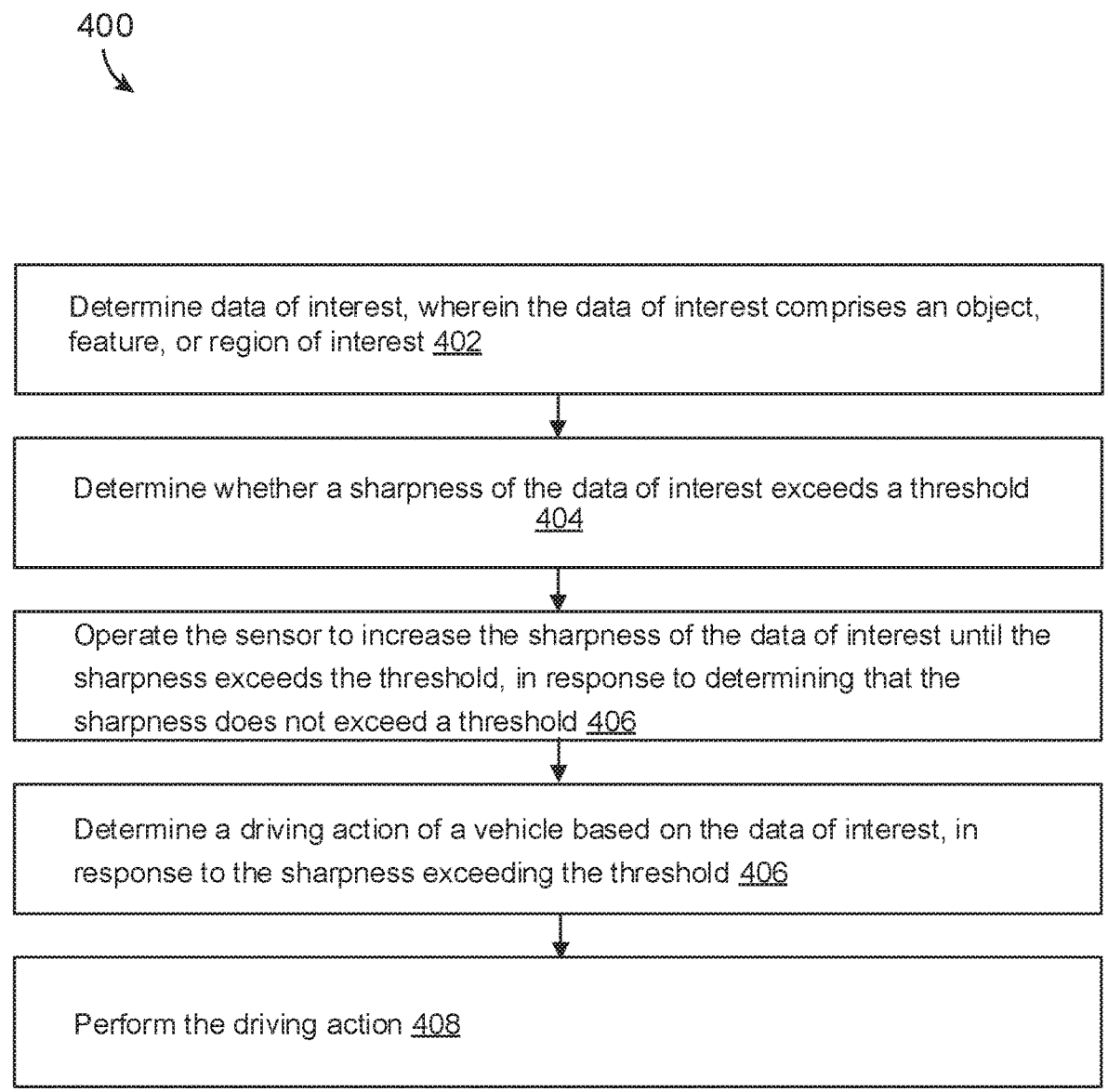
FIG. 4 illustrates a flowchart of an example of a method according to some embodiments of the present disclosure.

FIG. 4 illustrates a flowchart of a method to assembly sensors in a daisy chain communication network according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 4.

In step 402, one or more processors may determine data of interest, wherein the data of interest comprises an object, feature, or region of interest. In step 404, the one or more processors may determine whether a sharpness of the data of interest exceeds a threshold. In step 406, the one or more processors may operate the sensor to increase the sharpness of the data of interest until the sharpness exceeds the threshold, in response to determining that the sharpness does not exceed a threshold. In step 408, the one or more processors may determine a driving action of a vehicle based on the data of interest. In step 410, the one or more processors may perform the driving action.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
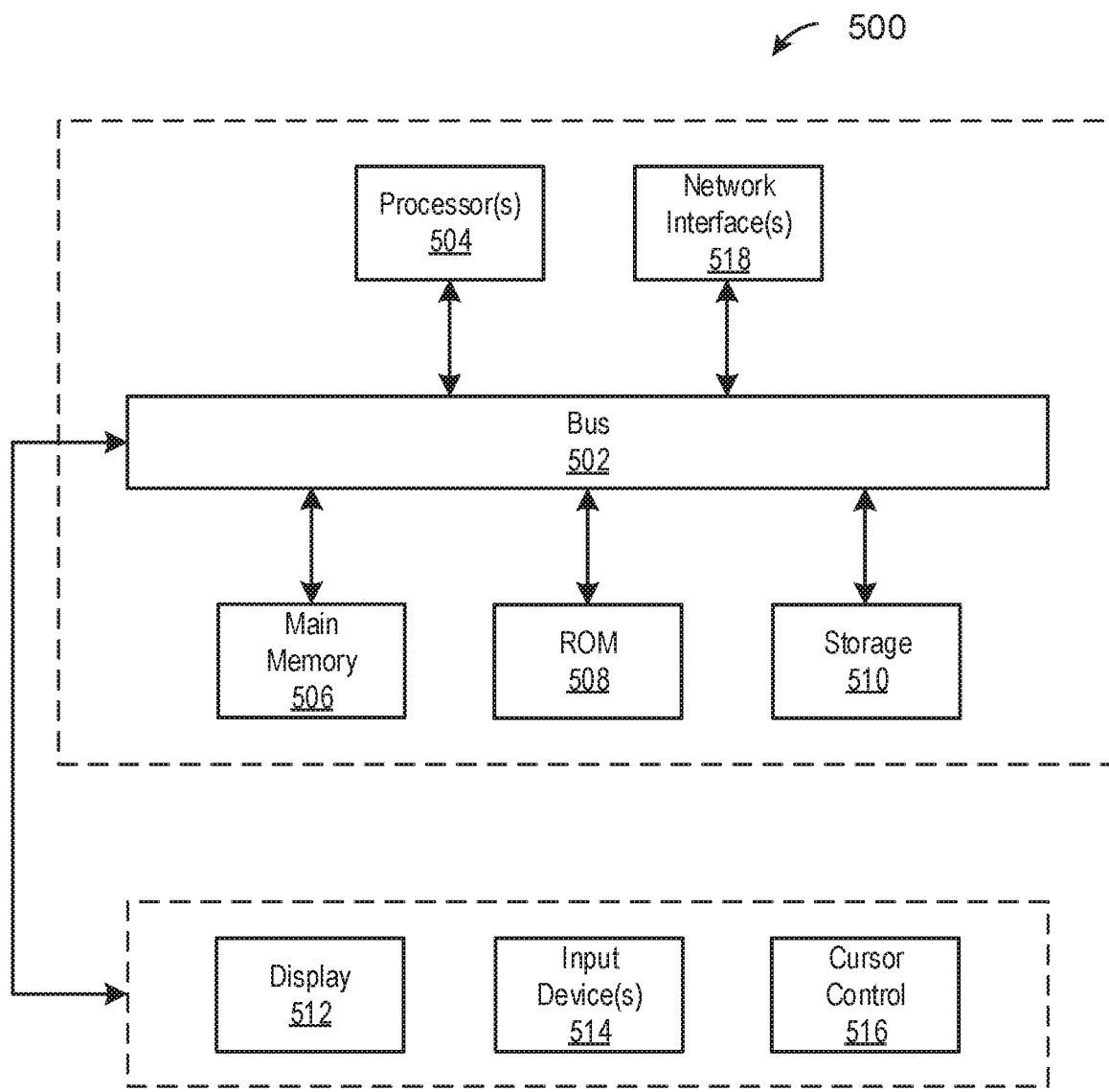
FIG. 5 is a diagram of an example computer system for implementing the features disclosed herein.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system comprising:
   a sensor;

one or more processors; and
a memory storing instructions that, when executed by the one or more processors, causes the system to perform:
   determining data of interest, wherein the data of interest comprises an object or feature, and the determination of the data of interest is based on a rate of change of the object or the feature, wherein the determining of the data of interest is in response to a difference between a first temperature, a first barometric pressure, a first pollution level, or a first smog level of a region in which the object or the feature is situated and a second temperature, a second barometric pressure, a second pollution level, or a second smog level of a surrounding region satisfying a criteria;
   determining whether a sharpness of the data of interest exceeds a threshold sharpness; and
   in response to determining that the sharpness does not exceed the threshold sharpness, operating the sensor to increase the sharpness of the data of interest until the sharpness exceeds the threshold.

2. The system of claim 1, wherein the operating of the sensor comprises performing, on a lens of the sensor, one or more operations selected from a group consisting of: an azimuth rotation, a tilt, and a translation.

3. The system of claim 1, wherein the operating the sensor comprises determining which one of an azimuth rotation, a tilt, and a translation to perform on a lens of a sensor based on a difference between the sharpness of the data and the threshold sharpness.

4. The system of claim 1, wherein the determining data of interest comprises predicting an existence of an object or feature based on another object or feature being present at a same location.

5. The system of claim 1, wherein the determining data of interest comprises predicting an existence of an object or feature based on a road condition or terrain.

6. The system of claim 1, wherein the threshold sharpness is determined based on a weather condition, an air condition, or a time of day.

7. The system of claim 1, wherein the instructions further cause the system to perform: in response to the sharpness of the data of interest exceeding the threshold sharpness, sending the data of interest to a vehicle.

8. A method implemented by a computing system including one or more processors and storage media storing machine-readable instructions, wherein the method is performed using the one or more processors, the method comprising:
   determining data of interest, wherein the data of interest comprises an object, feature, or region of interest and the determination of the data of interest is based on a rate of change of the object, feature, or region of interest, wherein the determining of the data of interest is in response to a difference between a first temperature, a first barometric pressure, a first pollution level, or a first smog level of a region in which the object or the feature is situated and a second temperature, a second barometric pressure, a second pollution level, or a second smog level of a surrounding region satisfying a criteria;
   determining whether a sharpness of the data of interest exceeds a threshold sharpness; and
   in response to determining that the sharpness does not exceed the threshold sharpness, operating the sensor to increase the sharpness of the data of interest until the sharpness exceeds the threshold.

9. The method of claim 8, wherein the operating of the sensor comprises performing, on a lens of the sensor, one or more operations selected from a group consisting of: an azimuth rotation, a tilt, and a translation.

10. The method of claim 8, wherein the operating the sensor comprises determining which one of an azimuth rotation, a tilt, and a translation to perform on a lens of a sensor based on a difference between the sharpness of the data and the threshold sharpness.

11. The method of claim 8, wherein the determining data of interest comprises determining the object or the feature to be data of interest in response to a difference between a first temperature, a first barometric pressure, a first pollution level, or a first smog level of a region in which the object or the feature is situated and a second temperature, a second barometric pressure, a second pollution level, or a second smog level of a surrounding region exceeding a threshold difference.

12. The method of claim 8, wherein the determining data of interest comprises predicting an existence of an object or feature based on another object or feature being present at a same location.

13. The method of claim 8, wherein the determining data of interest comprises predicting an existence of an object or feature based on a road condition or terrain.

14. The method of claim 8, wherein the threshold sharpness is determined based on a weather condition, an air condition, or a time of day.

15. The method of claim 8, further comprising:
   in response to the sharpness of the data of interest exceeding the threshold sharpness, sending the data of interest to a vehicle.

16. A vehicle comprising:
a sensor;
one or more processors; and
a memory storing instructions that, when executed by the one or more processors, causes the system to perform:
   determining data of interest, wherein the data of interest comprises an object or feature, and the determination of the data of interest is in response to a difference between a first temperature, a first barometric pressure, a first pollution level, or a first smog level of a region in which the object or the feature is situated and a second temperature, a second barometric pressure, a second pollution level, or a second smog level of a surrounding region satisfying a criteria;
   determining whether a sharpness of the data of interest exceeds a threshold sharpness;
   in response to determining that the sharpness does not exceed the threshold sharpness, operating the sensor to increase the sharpness of the data of interest until the sharpness exceeds the threshold.

17. The system of claim 16, wherein the determining of the data of interest comprises predicting an existence of the object or the feature based on a road condition or terrain.

* * * * *